(12) United States Patent
Lau

(10) Patent No.: US 6,617,742 B2
(45) Date of Patent: Sep. 9, 2003

(54) STAR CONNECTED ROTOR

(75) Inventor: James Ching Sik Lau, Hong Kong (CN)

(73) Assignee: Johnson Electric, S.A., La Chaux-de-Fonds (CH)

( * ) Notice: Subject to any disclaimer, the term of this patent is extended or adjusted under 35 U.S.C. 154(b) by 0 days.

(21) Appl. No.: 09/893,573

(22) Filed: Jun. 29, 2001

(65) Prior Publication Data

US 2002/0000760 A1 Jan. 3, 2002

(30) Foreign Application Priority Data

Jun. 30, 2000 (GB) ............................................. 0015913

(51) Int. Cl.⁷ .................................................. H02K 3/46
(52) U.S. Cl. ......................... 310/234; 310/71; 310/270
(58) Field of Search ................. 310/233–237, 310/71, 43, 194, 270, 264

(56) References Cited

U.S. PATENT DOCUMENTS

| | | | | |
|---|---|---|---|---|
| 3,244,917 A | * | 4/1966 | Gute | 310/154.07 |
| 3,532,913 A | * | 10/1970 | Forste et al. | 310/234 |
| 5,272,405 A | * | 12/1993 | Terada | 310/235 |
| 5,328,108 A | | 7/1994 | Murai | 242/7.03 |
| 5,442,849 A | * | 8/1995 | Strobl | 29/597 |
| 5,446,328 A | * | 8/1995 | Suzuki et al. | 310/233 |
| 5,552,652 A | * | 9/1996 | Shimoyama et al. | 310/233 |
| 5,650,683 A | * | 7/1997 | Shiga et al. | 310/201 |
| 5,912,523 A | * | 6/1999 | Ziegler et al. | 29/597 |
| 6,222,298 B1 | * | 4/2001 | Saito et al. | 29/597 |
| 6,242,838 B1 | * | 6/2001 | Kiyose et al. | 310/233 |

FOREIGN PATENT DOCUMENTS

| | | |
|---|---|---|
| EP | A1863602 | 9/1998 |
| GB | A2210512 | 6/1989 |
| JP | A62272838 | 11/1987 |
| JP | U464975 | 6/1992 |
| JP | 1141851 | 2/1999 |

* cited by examiner

*Primary Examiner*—Dang Dinh Le
(74) *Attorney, Agent, or Firm*—Birch, Stewart, Kolasch & Birch, LLP

(57) ABSTRACT

A star connected wound rotor has a shaft 12, a rotor core 14 fitted to the shaft, a commutator 16 fitted to the shaft adjacent one end of the rotor core and a star connector 18 fitted to the shaft adjacent the other end of the rotor core and a plurality of coils wound about the rotor core and connected to the commutator and the star connector, thereby forming a star connected rotor winding 20.

14 Claims, 2 Drawing Sheets

STAR CONNECTED ROTOR

BACKGROUND OF THE INVENTION

This invention relates to electric motors and in particular, to miniature p.m.d.c. motors with coils of armature windings connected in star configuration and to a star connector for achieving this connection.

While it is known to connect p.m.d.c. motors in star configuration, the star connector is usually a ring having terminals corresponding in number to the number of armature coils and fitted to the commutator by way of an insulating supporting sleeve which is pressed over the commutator brush contact surface, see for example, JP-U-4-64975. A major disadvantage of this construction is that the commutator must be made longer to accommodate the loss of brush contact surface occupied by the star connector. There is also the added possibility of causing damage to the brush contact surface when the star connector is pressed onto the commutator.

Thus, there is a need for a star connector which will not damage the commutator during assembly and which does not require the commutator to be modified.

SUMMARY OF THE INVENTION

Accordingly, the present invention provides a novel star connector and/or a motor incorporating such a connector.

Thus, according to a first aspect thereof, the present invention provides a star connected wound rotor for a miniature electric motor comprising: a shaft; an armature core fitted to the shaft and having a plurality of armature poles; a commutator having a plurality of commutator segments for making sliding contact with a brush assembly, the commutator being fitted to the shaft adjacent a first end of the armature core; a star connector; and a plurality of coils forming an armature winding, each coil being wound around an armature pole and being terminated on a segment of the commutator and on the star connector, characterized in that the star connector comprises a base of insulating material acting as a spacer and fitted to the shaft adjacent a second end of the armature core and a terminal ring of conductive material fitted to the base and having a plurality of terminals connected to the coils, thereby forming a star connected armature winding.

According to a second aspect thereof, the present invention provides a star connector for a miniature electric motor comprising a base of insulating resin material and a terminal ring of conductive material fitted to the base and having a number of terminals for connection of one end of the coils forming a rotor winding.

Also, in accordance with a third aspect, the present invention provides a star connector for electrically connecting together lead wires from coils of a wound rotor of a miniature d.c. electric motor, the connector comprising: a base for direct mounting onto a shaft of the rotor; and a conductive ring having terminals for termination of the lead wires; wherein the base has a central boss portion with a central opening for receiving the shaft, a wall extending radially from the boss, a skirt extending axially from the radially outer edge of the wall, a number of openings in the skirt and a number of buttresses formed on the wall and the base remote from the skirt but adjacent the openings, and wherein the conductive ring has a flat ring portion located against the wall of the base and supported by the skirt and having a number of terminals extending radially from the ring portion, each terminal having an axially U-shaped portion, the terminals extending through the openings in the skirt with the U-shaped portions located radially adjacent the buttresses.

BRIEF DESCRIPTION OF THE DRAWINGS

Two preferred embodiments of the present invention will now be described, by way of example only, with reference to the accompanying drawings in which.

DESCRIPTION OF THE PREFERRED EMBODIMENTS

Figure 1:
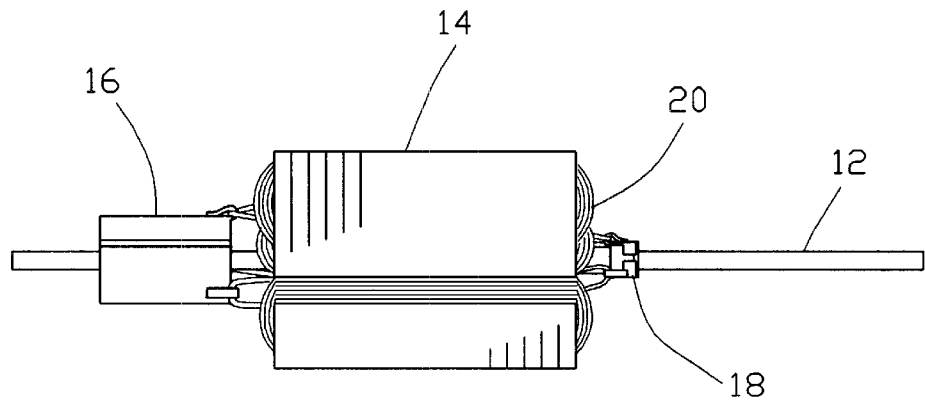
FIG. 1 is a diagrammatic representation of a wound rotor made in accordance with the present invention.

The preferred rotor 10, as shown in FIG. 1, has a shaft 12, an armature core 14 made of a stack of silicon steel laminations fitted to the shaft, a commutator 16 fitted to the shaft and located adjacent a first end of the armature core, a star connector 18 fitted to the shaft 12 and located adjacent a second end of the armature core 14 and a plurality of coils wound around poles of the armature core to form an armature winding 20. Each coil has a first end connected to the commutator and a second end connected to the star connector, thereby forming a star connected armature winding 20.

Figures 2, 3:
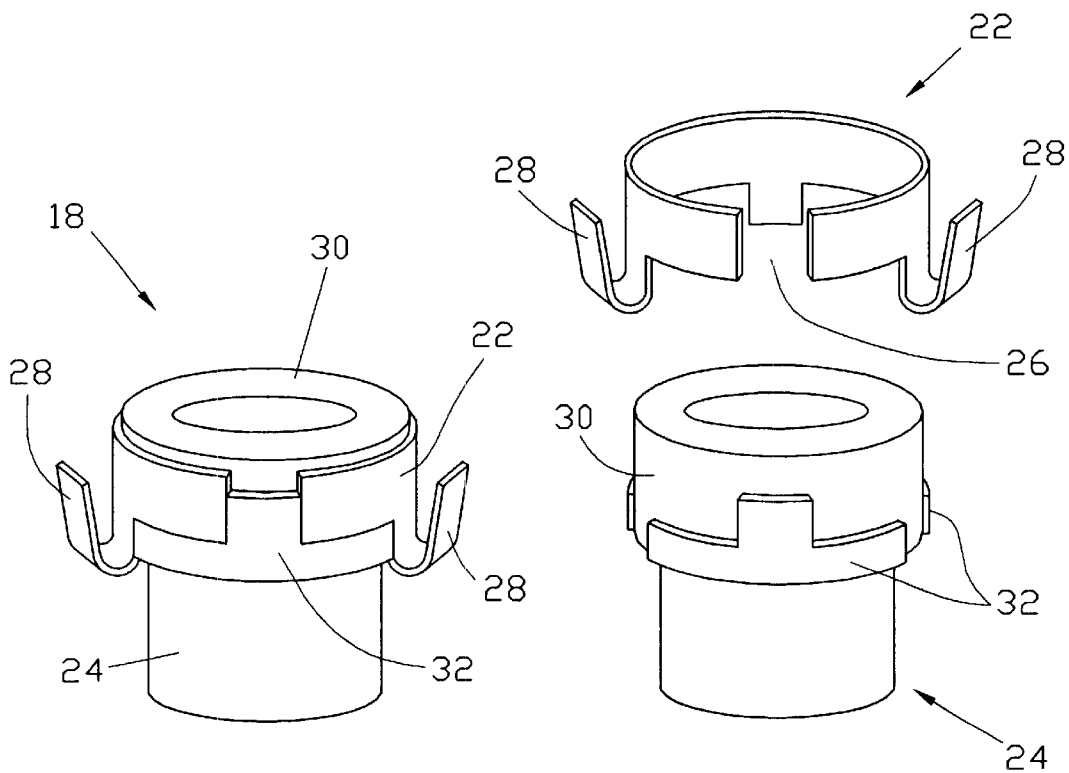
FIG. 2 is a star connector according to a first preferred embodiment of the present invention, as used in the rotor of FIG. 1.
FIG. 3 is an exploded view of the star connector of FIG. 2.

The star connector is shown more clearly in FIGS. 2 and 3. The star connector 18 has two parts, a terminal ring 22 and a base 24. The terminal ring 22 has terminals for connecting the armature windings. The base 24 is formed of insulating resin material which not only isolates the terminal ring from the shaft and armature core but also acts a spacer, locating the armature core a predetermined distance from an adjacent shaft bearing (not shown). FIG. 2 shows the base and terminal ring fitted together while in FIG. 3, the two parts are shown separated.

The terminal ring 22 is formed from sheet brass, copper or other suitable conductive material and is shaped into a ring with a split 26 and has a number of terminals 28 corresponding to the number of coils of the armature windings. The terminals have a U-shaped appearance, similar to tangs on a commutator, and the coils are connected to the terminals in a similar manner, i.e., by heat staking or welding. Alternatively, the terminals could be solder connectors or mechanical connection type terminals.

The base 24 has a cylindrical portion 30 for receiving the terminal ring. The cylindrical portion preferably has a diameter slightly larger than the free inside diameter of the terminal ring so that the ring is sprung onto the base. The base also has raised portions or detents 32 to key the terminal ring 22 to the base to 30 prevent the ring from rotating around the base as may otherwise occur under heavy vibration or adverse operating conditions as occurs when the motor is started or when the motor is abruptly stopped.

Figure 4:
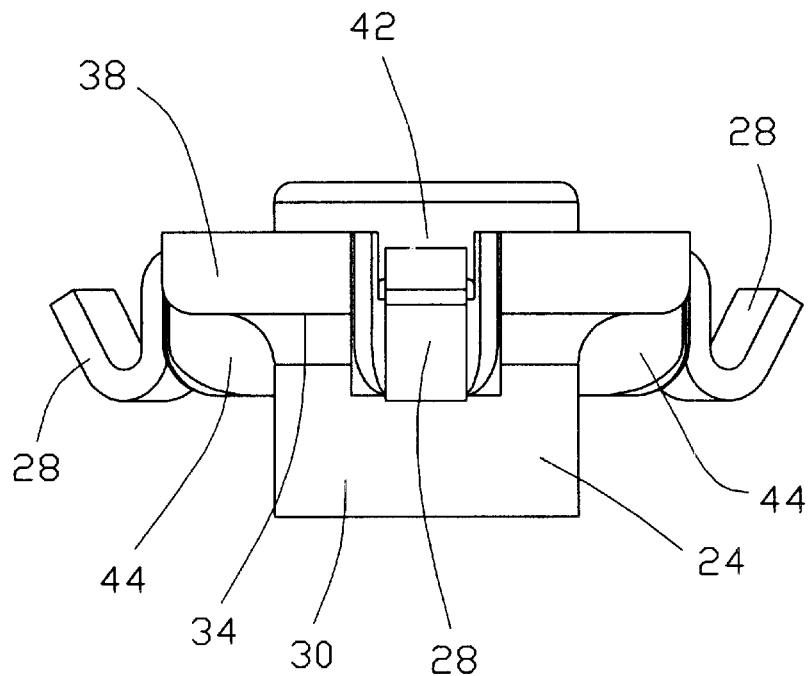
FIG. 4 is a star connector according to a second preferred embodiment of the present invention.
Figure 5:
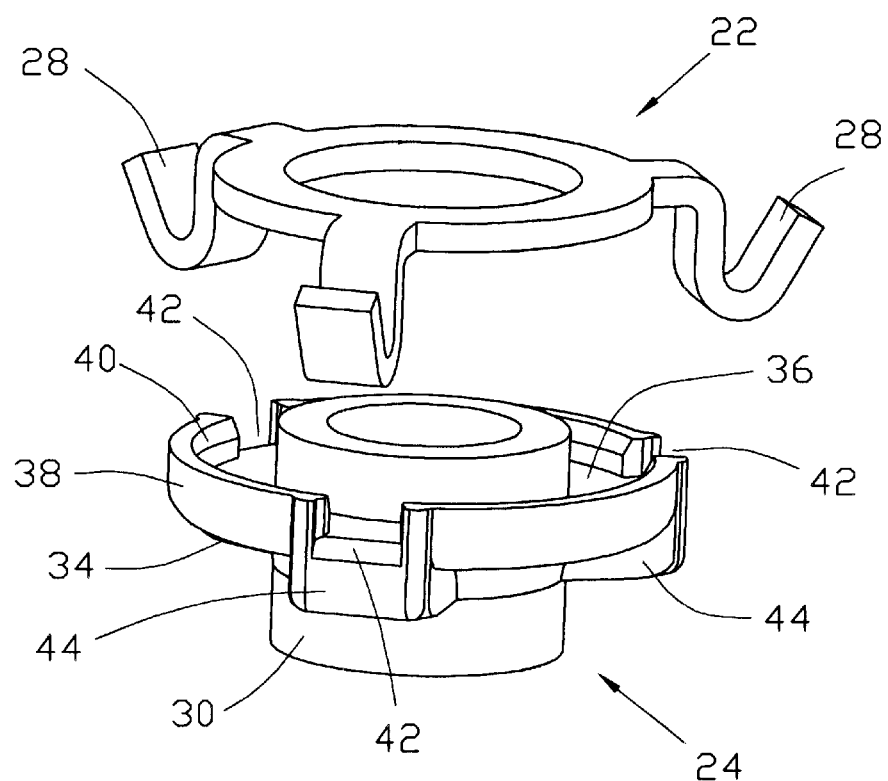
FIG. 5 is an exploded view of the star connector of FIG. 4.

FIGS. 4 and 5 illustrate a modified star connector. Like parts are indicated by like reference numerals.

In this embodiment of the star connector, the terminal ring 22 is stamped from a sheet of brass or copper such that the ring is planar and extends radially with the terminals being bent arms attached at the radially outer edge of the ring. The arms are bent so as to form axially extending U-shaped terminals.

The base 24 has a cylindrical portion 30 with a central opening for fitting to the shaft of the rotor. A radial wall 34 extends from the cylindrical portion 30 and has a radial face 36 which supports the terminal ring 22. The radial wall 34 has an axially extending skirt 38 which grips the radially outer edge of the terminal ring 22 as it is pressed against the radial face 36. The skirt 38 has a tapered mouth or leading edge 40 to assist insertion of the terminal ring 22. There are three openings 42 in the skirt 38 to accommodate the three terminals 28. A buttress 44 is located adjacent each opening 42 for supporting the terminals during the welding process of attaching the coils to the terminal ring. The skirt 38 and the openings 42 function similarly to the detents of the first embodiment. In addition, small projections extending radially inwards may be provided on the inner surface of the skirt to hold the terminal ring 22 against the face 36 of the radial wall 34. Alternatively, small projections may be formed on the base 24 for the same purpose.

Again, the base may act as a spacer ensuring a required distance between the rotor core and the shaft bearing. The end of the base may contact the bearing directly or by way of intermediaries such as low friction washers which may, for example, provide additional electrical insulation between the star connector and the bearing.

ADVANTAGE OF THE INVENTION

This type of star connector is particularly suitable for very small p.m.d.c. motors in the micromotor range where the physical size of the motor does not allow for the star connector to be located on the commutator side while allowing the rotor to be mass produced using automated winding machines.

While two preferred embodiments of the invention have been described, those skilled in the art will recognize many variations without departing from the spirit of the invention and it is intended to cover all such variations as fall within the scope of the invention as defined by the appended claims.

What is claimed is:

1. A star connected wound rotor for a miniature electric motor comprising:
   a shaft;
   an armature core fitted to the shaft and having a plurality of armature poles;
   a commutator having a plurality of commutator segments for making sliding contact with a brush assembly, the commutator being fitted to the shaft adjacent a first end of the armature core;
   a star connector; and
   a plurality of coils forming an armature winding, each coil being wound around an armature pole and being terminated on a segment of the commutator and on the star connector,
   the star connector comprising a base of insulating material fitted to the shaft adjacent a second end of the armature core and a terminal ring of conductive material radially spring-fitted to the base and having a number of terminals connected to the coils, thereby forming a star connected armature winding.

2. A rotor as defined in claim 1 wherein the base has at least one detent for keying the terminal ring to the base to prevent relative rotational movement therebetween.

3. A rotor according to claim 1, wherein the base has a cylindrical portion for receiving the terminal ring and the terminal ring has a split with a free internal diameter less than the diameter of the cylindrical portion.

4. A rotor according to claim 1, wherein the terminal ring is formed from sheet material of copper or copper alloy.

5. A rotor according to claim 1, wherein the base is molded from insulating resin material.

6. A star connector for a wound rotor of a miniature electric motor comprising a base of insulating resin material and a terminal ring of conductive material radially spring-fitted to the base and having a number of terminals for connection of one end of each coil of the wound rotor.

7. A star connector according to claim 6, wherein the base has a cylindrical portion for receiving the terminal ring and the terminal ring is split with a free internal diameter less than or equal to the diameter of the cylindrical portion.

8. A star connector according to claim 6, wherein the terminal ring is formed from sheet material containing copper.

9. A star connector according to claim 6, wherein the base has at least one detent for keying the terminal ring to the base to prevent the terminal ring from rotating about the base.

10. A star connector according to claim 6, wherein the base is adapted to receive a shaft of the motor and to function as a spacer.

11. A star connector for electrically connecting together lead wires from coils of a wound rotor of a miniature d.c. electric motor, the connector comprising:
    a base for direct mounting onto a shaft of the rotor; and
    a conductive ring having terminals for termination of the lead wires;
    wherein the base has a central boss portion with a central opening for receiving the shaft, a wall extending radially from the boss, a shirt extending axially from the radially outer edge of the wall, a number of openings extending axially through the skirt and a number of buttresses formed on the wall and the base remote from the skirt but adjacent the openings, and
    wherein the conductive ring has a flat ring portion located against the wall of the base and supported by the skirt and having a number of terminals extending radially from the ring portion, each terminal having an axially U-shaped portion, the terminals extending through the opening in the skirt with the U-shaped portions located radially adjacent the buttresses.

12. A star connector according to claim 11, wherein the skirt has a tapered inner surface forming a mouth.

13. A star connector according to claim 11, wherein the skirt has a plurality of detents for retaining the connector ring against the radial wall.

14. A star connector according to claim 11, wherein the base has a number of detents for retaining the connector ring against the radial wall,
    a conductive ring having terminals for termination of the lead wires;
    wherein the base has a central boss portion with a central opening for receiving the shaft, a wall extending radially from the boss, a shirt extending axially from the radially outer edge of the wall, a number of openings extending axially through the skirt and a number of buttresses formed on the wall and the base remote from the skirt but adjacent the openings, and
    wherein the conductive ring has a flat ring portion located against the wall of the base and supported by the skirt and having a number of terminals extending radially from the ring portion, each terminal having an axially U-shaped portion, the terminals extending through the opening in the skirt with the U-shaped portions located radially adjacent the buttresses.

* * * * *